July 21, 1970　　　TETSUNOSUKE MURAI　　　3,521,391
MOTORCAR LICENSE PLATE
Filed April 5, 1968
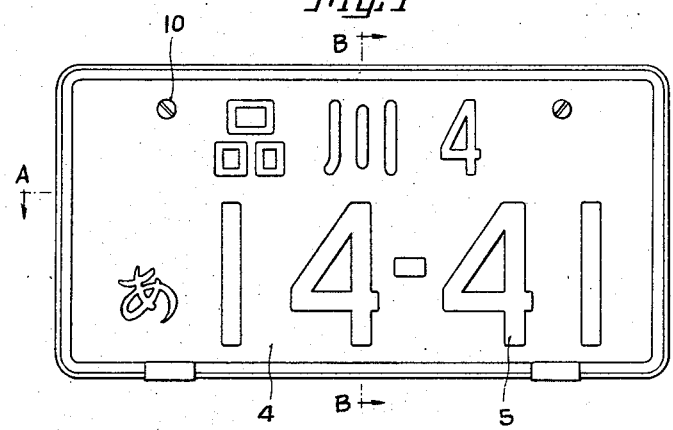
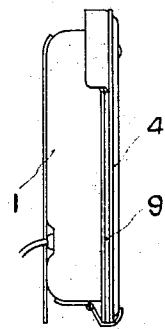
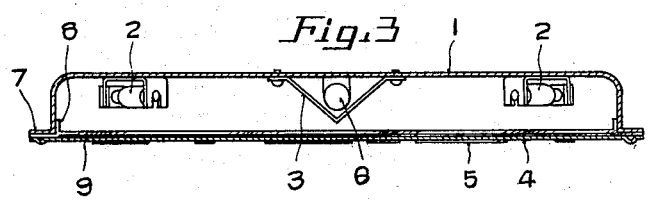
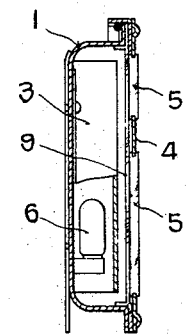
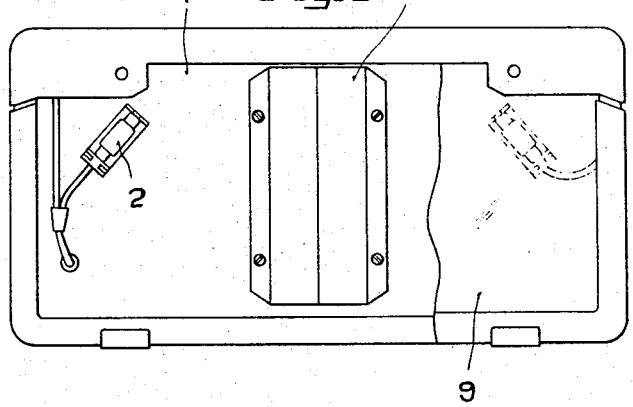
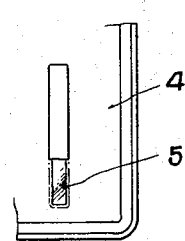
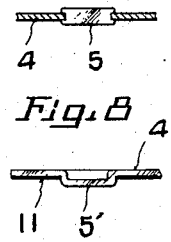
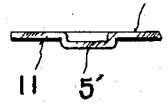
INVENTOR.
TETSUNOSUKE MURAI
BY

United States Patent Office

3,521,391
Patented July 21, 1970

---

3,521,391
MOTORCAR LICENSE PLATE
Tetsunosuke Murai, 19 Nishi 4-chome, Kitanijunijyo,
Sapporo-shi, Japan
Filed Apr. 5, 1968, Ser. No. 719,096
Int. Cl. G09f 13/04
U.S. Cl. 40—204                                           2 Claims

ABSTRACT OF THE DISCLOSURE

A motorcar license plate, wherein a number lamp is positioned within a reflection case and the number bearing license plate is formed by a light transmissive number mounted in a light non-transmissive plate which is fitted to the open end of the reflection case. The number on the license plate is made clearly visible at night by the light transmitted through the number and is produced from the reflected light of a number lamp at night so that the number is readable even from a long distance. Further, by employing a time delay means inserted in the electric circuit of the number lamp and, though the motorcar lights are switched off by the driver, the number lamp is kept lighted for a certain determined period of time against the driver's will and the number remains readable.

SUMMARY OF THE INVENTION

Recently with the considerable increase in the number of vehicles in use, there has been a steady increase in the number of traffic accidents. Such accidents, and especially personal injury accidents are often caused at night and it is a matter of regret that there are some irresponsible drivers who try to flee the accident by putting out their motorcar lights including the licence plate number, the tail lamp and the like.

The object of the invention is to prevent such irresponsible drivers from avoiding detection by turning off their motor car lights, namely, this invention is directed to a number lamp positioned within a reflection case backing a number bearing license plate which comprises a light transmissive number mounted in the light non-transmissive license plate. The license plate is fitted on the open end of said reflection case and the number on the plate is made clearly visible at night by the light transmitted through the number. The light is produced by the reflected light from the number lamp within the reflection case and thereby the number is readable even from a great distance. Further, a relay switch or a delay relay is inserted in the electric circuit of the number lamp and though the motorcar lights are switched off by the driver, the number lamp is kept lighted for a certain determined period of time against the driver's will and, as a result, the illuminated number remains readable.

The objects and advantages of this invention will be explained by the embodiment shown in the drawings, in which FIG. 1 is a front view of a combined license plate and reflection case embodying the present invention;

FIG. 2 is a side view;

FIG. 3 is a sectional view taken along the line A—A of FIG. 1;

FIG. 4 is a sectional view taken along the line B—B of FIG 1;

FIG. 5 is a front view partly cut off excluding the plate;

FIG. 6 is a partial front view showing the plate;

FIG. 7 is a cross sectional view of FIG. 6;

FIG. 8 is a cross sectional view of FIG. 6; and

FIG. 9 is a vertical partly sectional view showing the delay switch and electric circuit.

In the drawings, 1 is a flat reflection case whose front is opened. The case is formed in a press from a metal plate or from an elastic hard synthetic resin material and its inside has a reflection face and number lamp 2 are fitted to both sides of the interior of this case. Moreover, an angle-shaped reflection plate 3 is fitted to the middle of the case. A number cutout is punched from a light non-transmissive or opaque license plate 4 and in the cutout portion a light transmissive number 5 is fitted. The license plate extends across the open end of the reflection case 1 and the number 5 is constituted so as to be made visible on the license plate 4 from the light transmitted from the number lamps 2 within the case. Further, the time delay means, for example a delay switch 6 or a delay relay, connected to the electric circuit of the number lamps 2 is fitted within the angularly-shaped reflection plate 3.

In fitting the license plate 4 to the reflection case 1, a milk-white synthetic resin plate 9 has an insertion edge 8 which is disposed between a bent edge 7 of the case and the plate 4 and is secured by screws 10. Accordingly, the reflected light is uniformly distributed by the milk-white plate 9, and coupled with the regulation of the reflected light within the case by the angular reflection plate, locally strong light is emitted through the number so that any difficulty in reading the license plate is prevented. Therefore, the plate 9 in the license plate construction serves to facilitate its reading by applying light uniformly to each part of the number and at the same time serves as a packing by which dust or rain-water is prevented from penetrating into the case.

The number plate 4 is made in such a method that the shape of the number is punched in a metal plate and a clear synthetic resin material 5 of the prescribed color is inserted in the punched out portion and is fixed by a heat press from both sides and the circumference of the material 5 is held by the edge of the punched out portion. It goes without saying that the plate 4 is painted in the ground color prescribed. Alternatively, the portion of the number 5', see FIG. 8, is formed by pressing its configuration in the optional clear synthetic resin plate 4' of the same color as the prescribed color of the number, and the remaining portion of the plate 4' is coated with paint 11 of the same color as that of the plate and thereby the same object is attained.

As mentioned above, it is most desirable to position the delay switch 6 or the delay relay within the reflection case 1 but if necessary, the switch or relay may be provided at a suitable position outside the case. Various devices may be employed as the delay switch, but as an example, reference is made to FIG. 9; containing the following: an elastic conduction piece 12, which is folded over at its upper part or apex and is bent or curved along its sides, is enclosed in a vacuum bulb 6 and a heating metal rod 13 having a high rate of linear thermal expansion is positioned in the middle of the bulb within the conduction piece. A conductor 14 is provided along side the rod 13 and has a contact point 15 opposite a similar contact point on the conduction piece 12. The contact point side of the conduction piece 12 is connected to the number lamp 2 and through the opposite contact point 15 and the conductor 14 is arranged to be connected to a power source 16. The power source side of the conduction piece 12 and the heating metal rod 13 are connected by means of a conductor 17. Thereupon, when a main switch 18 is closed, the circuit of the number lamp 2 is closed through the conduction piece 12 from the power source 16, and the lamp is lit up and at the same time the heating metal rod 13, due to its thermal expansion, expands upwardly and therefore the apex portion of the elastic conduction piece 12 is thrust upwardly and the curved portion on both sides is extended and flattened and the contact point 15 comes in contact with the curved portion of the conduction piece. In consequence, even if the switch 18 is opened under this condition, the power source is connected to the lamp through the contact point 15 from the conductor 14 and therefore the number lamp remains lighted for a fixed period of time until the metal rod 13 is cooled and restored to the original condition breaking the contact point 15.

As mentioned above, by using the license plate of this invention, even if a driver who has caused an accident at night tries to flee by turning off the motorcar lighting, such as the number lamp, and the other lamps, the number lamp remains lighted for a certain determined period of time even after the lights have been switched off and therefore a witness can easily discern the number on the license plate. Therefore, the license plate construction of this invention displays a desirable effect in thwarting irresponsible drivers who try to flee after causing an accident.

What is claimed is:

1. A motorcar license plate device comprising a case having an open face therein, a license plate disposed across the open face of said case, said license plate formed in part of an opaque material and having at least one portion thereof formed of a translucent material in the shape of an identifying character, means within said case for transmitting light through the translucent material portion of said plate whereby the identifying character is visible at night, and means disposed in communication with said means for transmitting light and arranged to continue the passage of light through said plate for a period of time after the regular supply of power to the light has been discontinued, said means for transmitting light comprising electric lamps disposed within said case for furnishing light therein, an electric circuit containing said electric lamps, and a reflection plate having a pair of angularly disposed surfaces arranged to reflect light from said electric lamp means through the portion of said license plate forming the identifying character, said means for continuing the passage of light comprises a time delay switch connected into said electrical circuit for said electric lamps, said time delay switch comprises a resilient conducting member folded to afford an apex and a pair of normally outwardly bent sides, a metal rod having a high rate of linear thermal expansion as compared to said conducting member disposed within said conducting member and aligned with the apex thereof, said metal rod arranged to be connected to the source of power for said electric lamps, a contact member arranged to be connected to the source of power through said metal rod, a first lead connecting said conducting member to said electric lamps, a second lead connecting said conducting member to the source of power, a switch is said second lead for selectively supplying power to said conducting member and therethrough to said lamps whereby as power is supplied to said conducting member and therethrough to said lamps said metal rod is heated and expands contacting the apex of said conducting member and causing the conducting member to stretch whereby the inner surface of the bent sides are straightened and contact the contact member whereby when the switch is said second lead is opened the conducting member continues in contact with said source of power through said contact member until said conducting member cools and contracts allowing said conducting member to return to its original configuration and thereby breaking contact between the side of said conducting member and said contact member for cutting off the source of power to said electric lamps at a determined period of time after the switch in said second lead is opened.

2. A motorcar license plate device as set forth in claim 1, wherein said time delay switch is located at a point spaced from said case and also is arranged to be spaced from the operator of a motocar whereby the operator is unable to disconnect the switch when turning off the motorcar lights from the operator's position in the motorcar.

References Cited

UNITED STATES PATENTS

| 1,250,644 | 12/1917 | Pelton | 40—205 |
| 1,635,863 | 7/1927 | Schulz et al. | 40—136 |
| 1,800,603 | 4/1931 | Carlson | 40—205 |
| 1,828,321 | 10/1931 | Hesse | 337—88 |
| 2,193,058 | 3/1940 | Carver | 40—133 |
| 2,632,270 | 3/1953 | Moss | 40—136 |
| 2,935,588 | 5/1960 | Slater | 337—88 X |

EUGENE R. CAPOZIO, Primary Examiner

W. J. CONTRERAS, Assistant Examiner

U.S. Cl. X.R.

40—129, 130